US012752236B2

(12) United States Patent
Maguire-Boyle et al.

(10) Patent No.: US 12,752,236 B2
(45) Date of Patent: Oct. 6, 2026

(54) USE OF SILICA NANOPARTICLES WITH TRIAZINE FOR H2S SCAVENGING

(71) Applicant: NISSAN CHEMICAL AMERICA CORPORATION, Houston, TX (US)

(72) Inventors: Samuel James Maguire-Boyle, Spring, TX (US); John Edmond Southwell, Glen Ellyn, IL (US)

(73) Assignee: Nissan Chemical America Corporation, Houston, TX (US)

( * ) Notice: Subject to any disclaimer, the term of this patent is extended or adjusted under 35 U.S.C. 154(b) by 520 days.

(21) Appl. No.: 18/546,664

(22) PCT Filed: Feb. 18, 2022

(86) PCT No.: PCT/US2022/016946

§ 371 (c)(1),
(2) Date: Aug. 16, 2023

(87) PCT Pub. No.: WO2022/178232

PCT Pub. Date: Aug. 25, 2022

(65) Prior Publication Data

US 2024/0139680 A1 May 2, 2024

Related U.S. Application Data

(60) Provisional application No. 63/151,212, filed on Feb. 19, 2021.

(51) Int. Cl.

| | |
|---|---|
| ***B01D 53/78*** | (2006.01) |
| ***B01D 53/52*** | (2006.01) |
| ***B01D 53/86*** | (2006.01) |
| ***C10G 17/04*** | (2006.01) |

(52) U.S. Cl.

CPC ............. *B01D 53/78* (2013.01); *B01D 53/52* (2013.01); *B01D 53/8612* (2013.01); *C10G 17/04* (2013.01); *B01D 2252/20436* (2013.01); *B01D 2255/30* (2013.01); *B01D 2256/22* (2013.01); *B01D 2257/304* (2013.01)

(58) Field of Classification Search

None

See application file for complete search history.

(56) References Cited

U.S. PATENT DOCUMENTS

| | | | |
|---|---|---|---|
| 1,991,765 | A | 2/1935 | Marks |
| 2,606,873 | A | 8/1952 | Cardwell et al. |
| 3,514,410 | A | 5/1970 | Engle et al. |
| 3,585,069 | A | 6/1971 | Owsley |
| 3,669,613 | A | 6/1972 | Knox et al. |
| 4,220,500 | A | 9/1980 | Baba et al. |
| 4,289,639 | A | 9/1981 | Buske |
| 4,310,435 | A | 1/1982 | Frenier |
| 4,680,127 | A | 7/1987 | Edmondson |
| 4,808,765 | A | 2/1989 | Pearce et al. |
| 4,978,512 | A | 12/1990 | Dillon et al. |
| 5,085,842 | A | 2/1992 | Porz et al. |
| 5,208,369 | A | 5/1993 | Crump et al. |
| 5,980,845 | A | 11/1999 | Cherry |
| 7,141,518 | B2 | 11/2006 | Macdonald et al. |
| 7,438,875 | B2 | 10/2008 | Do et al. |
| 7,985,881 | B2 | 7/2011 | Westlund et al. |
| 9,006,508 | B2 | 4/2015 | Kanazirev et al. |
| 9,463,989 | B2 | 10/2016 | Menendez et al. |
| 10,155,911 | B2 | 12/2018 | Tan |
| 11,059,079 | B1 | 7/2021 | Allred, Jr. |
| 11,077,474 | B1 | 8/2021 | Allred, Jr. |
| 11,512,241 | B2 | 11/2022 | Allred, Jr. |
| 11,732,181 | B2 | 8/2023 | Allred, Jr. |
| 12,275,891 | B2 | 4/2025 | Allred, Jr. |
| 2005/0084438 | A1 | 4/2005 | Do et al. |
| 2005/0085144 | A1 | 4/2005 | Macdonald et al. |
| 2009/0065445 | A1 | 3/2009 | Westlund et al. |
| 2011/0000854 | A1 | 1/2011 | Nichols et al. |
| 2011/0155646 | A1 | 6/2011 | Karas et al. |
| 2013/0004393 | A1 | 1/2013 | Menendez et al. |
| 2013/0204065 | A1 | 8/2013 | Kanazirev et al. |
| 2014/0155669 | A1 | 6/2014 | Slowing et al. |
| 2016/0030916 | A1* | 2/2016 | Shen .................. B01D 19/0005 423/220 |
| 2016/0237335 | A1 | 8/2016 | Salla et al. |
| 2018/0044598 | A1 | 2/2018 | Tan |
| 2018/0291284 | A1 | 10/2018 | Sommese et al. |
| 2018/0345212 | A1 | 12/2018 | Legaspi Felipe et al. |

(Continued)

FOREIGN PATENT DOCUMENTS

| | | | |
|---|---|---|---|
| CA | 2769060 | A1 | 8/2013 |
| CN | 101591555 | B | 7/2012 |
| CN | 102585952 | A | 7/2012 |

(Continued)

OTHER PUBLICATIONS

Sjoberg; Silica in aqueous environments; Journal of Non-Crystalline Solids 196, 51-57; 1996.*

Amit Singh et al., Copper Coated Silica Nanoparticles for Odor Removal, Sep. 26, 2010, 26(20), American Chemical Society, pp. 15837-15844.

Faeze Tari et al., Modified and Systematic Synthesis of Zinc Oxidesilica Composite Nanoparticles With Optimum Surface Area as a Proper H2S Sorbent, Apr. 1, 2017, vol. 95, No. 4, Canadian Journal of Chemical Engineering, 7 pages.

Jan M. Bakke, et al. Hydrolysis of 1,3,5-Tris(2-hydroxyethyl)hexahydro-s-triazine and Its Reaction with H2S, Ind. Eng. Chem. Res., vol. 40, 2001, 4 pages.

Hydrogen Sulfide Scavenger (H2S Scavenger), Corrosionpedia, Last updated: Jul. 19, 2024, Retrieved from the Internet URL:https://www.corrosionpedia.com/definition/1645/hydrogen-sulfide-scavenger-h2s-scavenger.

(Continued)

*Primary Examiner* — Guinever S Gregorio
(74) *Attorney, Agent, or Firm* — Nixon & Vanderhye, PC

(57) ABSTRACT

A process to remove $H_2S$ from a stream comprising the steps of adding a silica nanoparticle composition and optionally a triazine, wherein the stream is selected from the group consisting of Oil streams, Gas streams, $CO_2$ point source purification streams and Geothermal Energy System streams.

6 Claims, No Drawings

(56) References Cited

U.S. PATENT DOCUMENTS

| | | | |
|---|---|---|---|
| 2021/0322920 A1 | 10/2021 | Sahoo et al. | |
| 2025/0243399 A1 | 7/2025 | Allred, Jr. | |

FOREIGN PATENT DOCUMENTS

| | | | |
|---|---|---|---|
| CN | 106795752 B | 8/2020 | |
| EP | 3566762 A2 | 11/2019 | |
| JP | 5-509035 A | 12/1993 | |
| RU | 2499031 C2 | 11/2013 | |
| RU | 2533494 C1 | 11/2014 | |
| RU | 2614014 C1 | 3/2017 | |
| WO | 9408980 A1 | 4/1994 | |
| WO | 2016019101 A1 | 2/2016 | |
| WO | 2018009497 A1 | 1/2018 | |
| WO | 2020039199 A1 | 2/2020 | |
| WO | 2022178251 A1 | 8/2022 | |
| WO | 12022178286 A1 | 8/2022 | |

OTHER PUBLICATIONS

L. Chu et al., Glycidoxypropyltrimethoxysilane Modified Colloidal Silica Coatings, MRS Proceedings, Jan. 1, 1996, 5 pages, vol. 435, XP055524536.
L. Hoven et al., Odour Management Guidance for Refineries, Jan. 1, 2020, pp. 1-93, XP055851362.
Michael Gonser, et al., Simultaneous Control of Subsurface Scale, Corrosion, and H2S Using a Single Capillary String: A Real-World Chemical Application in the Permian Basin, 2022 SPE Annual Technical Conference and Exhibition, Oct. 5, 2022, 20 pages.
Mohamed Chehimi et al., Surface chemical and thermodynamic properties of [gamma]-glycidoxy-propyltrimethoxysilane-treated alumina: an XPS and IGC study, Journal of Materials Chemistry, Jan. 1, 2001, pp. 533-543, vol. 11, No. 2.
Zeina Abbas et al., Evaluation of CO2 Purification Requirements and the Selection of Processes for Impurities Deep Removal from the CO2 Product Stream, Energy Procedia, 2013, pp. 2389-2396, vol. 37.
Schaak and Chan, H2S Scavenging: Caustic-based process remains attractive, Oil & Gas Journal, vol. 87, No. 5, pp. 81-82, Jan. 1989.
Schaak and Chan, H2S Scavenging: Cost estimating depends on location material, Oil & Gas Journal, vol. 87, No. 9, pp. 90-91, Feb. 1989.
Schaak and Chan, H2S Scavenging: Formaldehyde-methanol, metallic-oxide agents head scavengers list, Oil & Gas Journal, vol. 87, No. 4, pp. 51-55, Jan. 1989.
Schaak and Chan, H2S Scavenging: Process design guidelines vary widely, Oil & Gas Journal, vol. 87, No. 8, pp. 45-48, Feb. 1989.
International Search Report for PCT/US2022/016946 mailed May 3, 2022, 5 pages.
Written Opinion of the ISA for PCT/US2022/016946 mailed May 3, 2022, 5 pages.
U.S. Appl. No. 18/546,674, filed Aug. 16, 2023, Southwell et al.
U.S. Appl. No. 18/546,662, filed Aug. 16, 2023, Coady et al.
U.S. Appl. No. 18/546,759, filed Aug. 16, 2023, Southwell et al.
U.S. Appl. No. 18/546,755, filed Aug. 16, 2023, Maguire-Boyle et al.
Response filed on Aug. 20, 2025 in related Japanese Application No. 2023-550171.
Japanese Office Action mailed Jul. 29, 2025 in related Japanese Patent Application No. 2023-550171, 8 pages.
Canadian Office Action issued Jan. 10, 2025 in related Canadian Patent Application No. 3,208,683 and response filed on Feb. 21, 2025, 13 pages.
Portela et al., "Spectroscopic evaluation of commercial H2S scavengers", Fuel 216 (2018) 681-685.
Japanese Notice of Allowance dated Oct. 14, 2025 and English translation of allowed claims in related Japanese Patent Application No. 2023-550171, 4 pages.
Vietnamese Office Action issued Mar. 13, 2026 in related Vietnamese Patent Application No. 1-2023- 06321 and response filed on Apr. 7, 2026, 6 pages.

* cited by examiner

USE OF SILICA NANOPARTICLES WITH TRIAZINE FOR H2S SCAVENGING

CROSS-REFERENCE TO RELATED APPLICATIONS

This application is the U.S. national phase of International Application No. PCT/US2022/016946 filed Feb. 18, 2022, which designated the U.S. and claims the benefit of U.S. provisional application No. U.S. 63/151,212 filed Feb. 19, 2021, the entire contents of each of which are hereby incorporated by reference.

FIELD OF THE INVENTION

This invention is in the field of chemicals used to remove hydrogen sulfide ($H_2S$) from Oil streams, Gas streams, $CO_2$ point source purification and Geothermal Energy Systems.

BACKGROUND OF THE INVENTION

Hydrogen sulfide is present in natural gas from many gas fields. It can also be present in Oil streams, Gas streams, $CO_2$ point source purification and Geothermal Energy Systems.

It is a highly undesirable constituent because it is toxic and corrosive and has a very foul odor. Therefore, several methods for its removal have been developed.

One such method is the injection of an aqueous solution of 1,3,5-tris(2-hydroxyethyl)hexahydro-s-triazine into the gas stream. Triazine is a liquid scavenger so the process is economical up to approximately 50 kg of $H_2S$/day and will remove $H_2S$ down to ca. 5 ppm in streams with relatively low concentrations of $H_2S$. However, because the products and the details of the reaction are not known, the optimal conditions for the $H_2S$ removal cannot always be applied. "Hydrolysis of 1,3,5-Tris(2-hydroxyethyl)hexahydro-s-triazine and Its Reaction with H2S, Ind. Eng. Chem. Res. 2001, 40, 6051-6054, page 6051. See: www.corrosionpedia.com/definition/1645/hydrogen-sulfide-scavenger-h2s-scavenger A hydrogen sulfide ($H_2S$) scavenger is a specialized chemical or fuel additive widely used in hydrocarbon and chemical processing facilities. These specialized chemicals react selectively with and remove $H_2S$ to help meet product and process specifications. Products treated for $H_2S$ include crude oil, fuels, and other refined petroleum products in storage tanks, tanker ships, railcars, and pipelines.

Hydrogen sulfide can cause damage to pipework, either by reacting directly with steel to create an iron sulfide corrosion film, or by increasing the acidity of the liquid/gas mixture in the pipes. When dissolved in water, $H_2S$ may be oxidized to form elemental sulfur. This can also produce an iron sulfide corrosion film when in direct contact with the metal surface. Therefore, it is essential to remove $H_2S$ from crude oil as quickly and efficiently as possible. Triazine, the most commonly used liquid $H_2S$ scavenger, is a heterocyclic structure similar to cyclohexane, but with three carbon atoms replaced by nitrogen atoms. Oilfield terminology of triazine differs from the IUPAC convention, triazinane.

Three variations of triazine exist, based on the location of the substitution of nitrogen atoms, are 1,2,3-triazine; 1,2,4-triazine and 1,3,5-triazine (aka s-triazine).

Further variations involving substitutions of the hydrogen atoms with other functional groups are used in various industries. The substitutions occurring at any number of the "R" locations, 1, 2, 3, 4, 5, or 6. Different substitutions result in different reactivity with $H_2S$, changes in solubility of triazine, and changes in the solubility of the reactant products (the "R" groups). Consequently, triazine can be "tailored" to better suit the application or disposal considerations.

Direct Injection

In direct-injection applications, the triazine is sprayed directly into the gas or mixed fluid stream, usually with an atomizing quill. Removal rate is dependent upon the $H_2S$ dissolution into the triazine solution, rather than the reaction rate. As a result, gas flow rate, contact time, and misting size & distribution contribute to the final scavenger performance. This method is excellent for removing $H_2S$ when there is good annular-mist flow and sufficient time to react. Most suppliers recommend a minimum of 15-20 seconds of contact time with the product for best results. Typical efficiencies are lower due to the $H_2S$ dissolution into the product, but ~40% removal efficiency can reasonably be expected. In order for direct injection to be effective, careful consideration of injection location and product selection must be used.

In a contactor tower, the feed gas is bubbled through a tower filled with triazine. As the gas bubbles up through the liquid, gas dissolves into the triazine and $H_2S$ is removed. The limiting factors in this application are the surface area of the bubble, the concentration of the solution, and bubble path time (contact time). Finer bubbles give a better reaction rate, but they can produce unwanted foaming. This application is not appropriate for high gas flow rates. Contactor towers have much greater $H_2S$ removal efficiencies, up to 80%. As a result, far less chemical is used and a significant reduction in operating expenditures ("OPEX") can be realized. However, the contactor tower and chemical storage take up significant space and weight, making them less practical for offshore application.

One mole of triazine reacts with two moles of $H_2S$ to form dithiazine, the main byproduct. An intermediate product is formed, but rarely seen. The R-groups that are released during the two-step reaction vary by the supplier and can be tailored for solubility. Continued reaction can result in the formation of an insoluble trithiane product.

Reacted triazine byproducts are readily biodegradable and relatively non-toxic. Unreacted, excess triazine has extremely high aquatic toxicity and a tendency to form carbonate scale with produced water or sea water; this can result in emulsion stabilization and increased overboard oil-in-water (OIW) content.

Unreacted triazine is also problematic for refineries as it impacts the desalting process and can cause accelerated corrosion within crude oil distillation units. It can also cause foaming in glycol and amine units and cause discoloration of glycol units. Unpleasant odor has also been reported with excess triazine usage, but some suppliers offer low-odor versions. Triazine itself is relatively safe to handle, but it can cause chemical burns upon contact.

Triazine and derivatives have been used successfully around the globe by many operators and facilities. It has been used in various other applications where control of low-concentration $H_2S$ is vital, including scale remediation and reservoir stimulation. It is commonly used with sour shale gas production in the US.

Triazine and derivatives are primarily used for removing low (<100 pounds per million standard cubic feet aka "ppmv/mmscf") levels of $H_2S$. These can be applied using a contact tower to increase (up to twice) the efficiency of $H_2S$ removal, but $H_2S$ levels >200 ppmv/mmscf will require the use of an amine-based sweetening unit. Triazine is also preferred in situations where the acid gas stream contains high levels of $CO_2$ in addition to $H_2S$. The triazine reacts preferentially with the $H_2S$ and the reaction is not inhibited by the $CO_2$, avoiding unnecessary chemical consumption. It is also preferred where a concentrated sour waste gas streams cannot be accommodated or disposed.

US 2018/291284 A1 "Microparticles For Capturing Mercaptans" published on Oct. 11, 2018 and is assigned to Ecolab. This now abandoned patent application describes and claims scavenging and antifouling nanoparticle compositions useful in applications relating to the production, transportation, storage, and separation of crude oil and natural gas, as well as oral hygiene. Also disclosed are methods of making the nanoparticle compositions as scavengers and antifoulants, particularly in applications relating to the production, transportation, storage, and separation of crude oil and natural gas, as well as oral hygiene.

Faeze Tari Et. Al., "Modified and Systematic Synthesis of Zinc Oxide-Silica Composite Nanoparticles with Optimum Surface Area as a Proper H2S Sorbent", Canadian Journal of Chemical Engineering, vol. 95, No. 4, 1 Apr. 2017, pages 737-743, describes work done to synthesize high surface area zinc oxide/silica composite nanoparticles via a facile and systemic process. Regarding the importance of surface area in application of such nanoparticles, variation of this factor was studied by change of reaction parameters including concentration of zinc acetate solution, pH, and calcination temperature via Response Surface method combined with Central Composite Design (RSM-CCD) . . . . Comparison of two 0.1 g/g (10 wt %) ZnO/Silica samples with the optimum (337 $m^2g^{-1}$) and non-optimum (95 $m^2g^{-1}$) surface areas indicated that nanoparticles prepared at the optimum conditions with average diameter of about 18 nm showed a $H_2S$ adsorption capacity of about 13 mg per gram of sorbent.

U.S. Pat. No. 5,980,845 "Regeneration of Hydrogen Sulfide Scavengers", issued on Nov. 9, 1999. This issued US patent describes and claims sulfide scavenger solutions and processes that have high sulfide scavenging capacity, provide a reduction or elimination of solids formation and avoid the use of chemicals that pose environmental concerns. The invention utilizes a dialdehyde, preferably ethanedial, for the purpose of reacting with amines, amine carbonates, or other derivatives of amines that are liberated when certain scavenger solutions react with sulfides, including hydrogen sulfide and mercaptans. The scavenger solutions that have been discovered to liberate amines are those formed by a reaction between an amine and an aldehyde.

US 2013/004393 "Synergistic Method for Enhanced H2S/Mercaptan Scavenging", issued as U.S. Pat. No. 9,463,989 B2 on Oct. 11, 2016. This patent describes and claims the use of a dialdehyde (e.g. glyoxal) and a nitrogen-containing scavenger (e.g. a triazine) when injected separately in media containing hydrogen sulfide ($H_2S$) and/or mercaptans to scavenge $H_2S$ and/or mercaptans therefrom gives a synergistically better reaction rate and overall scavenging efficiency, i.e. capacity, over the use of the dialdehyde or the nitrogen-containing scavenger used alone, but in the same total amount of the dialdehyde and nitrogen-containing scavenger. The media may include an aqueous phase, a gas phase, a hydrocarbon phase and mixtures of a gas and/or hydrocarbon phase with an aqueous phase.

US 2009/065445 A1, "Aromatic Imine Compounds for use as Sulfide Scavengers", issued as U.S. Pat. No. 7,985,881 B2 on Jul. 26, 2011. This patent describes and claims compositions and methods relating to aromatic imine compounds and methods of their use. The compounds are formed from aromatic aldehydes and amino or amino derivatives. The compounds and their derivatives are useful, for example, as hydrogen sulfide and mercaptan scavengers for use in both water and petroleum products.

US 2018/345212, "Architectured Materials as Additives to Reduce or Inhibit Solid Formation and Scale Deposition and Improve Hydrogen Sulfide Scavenging" published on Dec. 6, 2018. This patent application describes and claims methods for scavenging hydrogen sulfides from hydrocarbon or aqueous streams and/or reducing or inhibiting solids or scale formation comprising introducing an additive made up of architectured materials such as star polymers, hyperbranched polymers, and dendrimers that may be used alone or in conjunction with aldehyde-based, triazine-based and/or metal-based hydrogen sulfide scavengers to an aqueous or hydrocarbon stream. A treated fluid comprising a fluid containing hydrogen sulfide and an additive for scavenging hydrogen sulfide or reducing or inhibiting solids and scale formation made up of architectured materials such as star polymers, hyperbranched polymers, and dendrimers. The fluid may further include aldehyde-based, triazine-based and/or metal-based hydrogen sulfide scavengers.

L. Chu et al, "Glycidoxypropyltrimethoxysilane Modified Colloidal Silica Coatings", published in Mat. Res. Soc. Symp. Proc. Vol 435, © Materials Research Society, describes the preparation of coatings from a suspension of colloidal silica particles containing glycidoxypropyltrimethoxysilane (GPS) and a polyamine curing agent. GPS was first added to an aqueous silica suspension which contained ethanol (30 wt %) to enhance mxing. The addition of GPS to a basic silica suspension favored condensation among the silane monomers and oligomers, resulting in precipitation. By contrast, acidic conditions resulted in slower condensation which adsorption of the silane on silica, as followed by ATR-FTIR. After GPS addition and aging, the pH of the suspension was increased, a polyamine was added and coatings were prepared on polyester web. Coatings with GPS modification were denser, adhered better to the polymer substrate, and could be made thicker than unmodified silica coatings.

"Surface Chemical and hermodynamic Properties of ɣglycidoxy-propyltrimethoxysilane-treated alumina: an XPS and IGC study", Chehimi et al, J. Mat. Chem., 2001, 11, 533-543, ©The Royal Society of Chemistry 200, describes Alumina and hydrated alumina were treated with hydrolysed ɣ-glycidoxypropyltrimethoxysilane (GPS) in aqueous solution. The powder was then dried at various temperatures ranging from room temperature to 120° C. It was found that the hydration treatment used to create hydroxyl stes was efficient in terms of GPS adsorption. The uptake of GPS was determined by quantitative XPS analysis and the hydrated powders exhibited the highest uptake for all drying temperatures except room temperatures.

SUMMARY OF THE INVENTION

The first aspect of the instant claimed invention is a process to remove $H_2S$ from a stream comprising the steps of adding a) One or more aqueous acidic silica nanoparticle compositions and b) One or more Triazine compounds.

wherein the stream is selected from the group consisting of Oil streams, Gas streams, $CO_2$ point source purification streams and Geothermal Energy System streams.

The second aspect of the instant claimed invention is the process of the first aspect of the invention in which one of the triazines present is hexahydro-1,3,5-tris(hydroxyethyl)-s-triazine.

DETAILED DESCRIPTION OF THE INVENTION

For purposes of this patent application, silica nanoparticles include silica nanoparticles, alumina nanoparticles and silica-alumina nanoparticles.

The silica nanoparticles are sourced from all forms of precipitated $SiO_2$ a) dry silica;

b) fumed silica;

c) colloidal silica;

d) surface treated silicas including silicas reacted with organosilanes;

e) metal or metal-oxide with silica combinations; and f) precipitated silica.

There are known ways to modify the surface of colloidal silica:

1. Covalent attachment of Inorganic oxides other than silica.
2. Non-covalent attachment of small molecule, oligomeric, or polymeric organic materials (PEG treatment, amines or polyamines, sulfides, etc.).
3. Covalent attachment of organic molecule including oligomeric and polymeric species:
   a. Reaction with organosilanes/titanates/zirconates/germinates.
   b. Formation of organosilanes/titanate/zirconate/germinate oligomers followed by reaction of these with surface of colloidal silica.
   c. Silanization followed by post-reaction formation of oligomeric/dendritic/hyperbranched/polymeric species starting from colloidal silica surface.
   d. Formation of oligomeric/dendritic/hyperbranched/polymeric silanes/zirconates/titanates followed by reaction to $SiO_2$ surface.

The silica particles included in the colloidal silica may have any suitable average diameter. As used herein, the average diameter of silica particles refers to the average largest cross-sectional dimension of the silica particle. In an embodiment, the silica particles may have an average diameter of between about 0.1 nm and about 100 nm. In an embodiment, the silica particles may have an average diameter of between about 1 nm and about 100 nm. In an embodiment, the silica particles may have an average diameter of between about 5 nm and about 100 nm. In an embodiment, the silica particles may have an average diameter of between about 1 nm and about 50 nm. In an embodiment, the silica particles may have an average diameter of between about 5 nm and about 50 nm. In an embodiment, the silica particles may have an average diameter of between about 1 nm and about 40 nm. In an embodiment, the silica particles may have an average diameter of between about 5 nm and about 40 nm. In an embodiment, the silica particles may have an average diameter of between about 1 nm and about 30 nm. In an embodiment, the silica particles may have an average diameter of between about 5 nm and about 30 nm. In an embodiment, the silica particles may have an average diameter of between about 7 nm and about 20 nm.

In an embodiment, the silica particles have an average diameter of less than or equal to about 30 nm. In another embodiment, the silica particles may have an average diameter of less than or equal to about 25 nm. In another embodiment, the silica particles may have an average diameter of less than or equal to about 20 nm. In another embodiment, the silica particles may have an average diameter of less than or equal to about 15 nm. In another embodiment, the silica particles may have an average diameter of less than or equal to about 10 nm. In another embodiment, the silica particles may have an average diameter of less than or equal to about 7 nm. In another embodiment, the silica particles may have an average diameter of at least about 5 nm. In another embodiment, the silica particles may have an average diameter of at least about 7 nm. In another embodiment, the silica particles may have an average diameter of at least about 10 nm. In another embodiment, the silica particles may have an average diameter of at least about 15 nm. In another embodiment, the silica particles may have an average diameter of at least about 20 nm. In another embodiment, the silica particles may have an average diameter of at least about 25 nm. Combinations of the above-referenced ranges are also possible.

Colloidal silica is a flexible technology medium, allowing for customized surface treatment based on application. In an embodiment, the silica is a GlycidoxyPropylTriMethoxySilane-functional silica. GPTMS-functionalized silica includes alkaline sol silica, available from Nissan Chemical America as ST-V3. Another GPTMS-functionalized silica is an acidic type of silica sol, available from Nissan Chemical America as ST-OV3.

The amount of silica nanoparticle used per unit of H2S is as follows: In an embodiment, 1 unit of silica nanoparticle per 3 units of H2S, in another embodiment, 1 unit of silica nanoparticle per 5 units of H2S and in another embodiment, 1 unit of silica nanoparticle per 10 units of H2S.

The alumina nanoparticles are sourced from all forms of precipitated $Al_2O_3$ a) dry alumina;

b) fumed alumina;

c) colloidal alumina;

d) surface treated aluminas including aluminas reacted with organosilanes;

e) metal or metal-oxide with alumina combinations; and f) precipitated alumina.

There are known ways to modify the surface of colloidal alumina:

1. Covalent attachment of Inorganic oxides other than alumina.
2. Non-covalent attachment of small molecule, oligomeric, or polymeric organic materials (PEG treatment, amines or polyamines, sulfides, etc.).
3. Covalent attachment of organic molecule including oligomeric and polymeric species:
   a. Reaction with organosilanes/titanates/zirconates/germinates.
   b. Formation of organosilanes/titanate/zirconate/germinate oligomers followed by reaction of these with surface of colloidal alumina.
   c. Silanization followed by post-reaction formation of oligomeric/dendritic/hyperbranched/polymeric species starting from colloidal alumina surface.
   d. Formation of oligomeric/dendritic/hyperbranched/polymeric silanes/zirconates/titanates followed by reaction to $Al_2O_3$ surface.

The alumina particles included in the colloidal alumina may have any suitable average diameter. As used herein, the average diameter of alumina particles refers to the average largest cross-sectional dimension of the alumina particle. In an embodiment, the alumina particles may have an average diameter of between about 0.1 nm and about 100 nm. In another embodiment, the alumina particles may have an average diameter of between about 1 nm and about 100 nm. In another embodiment, the alumina particles may have an average diameter of between about 5 nm and about 100 nm. In another embodiment, the alumina particles may have an average diameter of between about 1 nm and about 50 nm. In another embodiment, the alumina particles may have an average diameter of between about 5 nm and about 50 nm. In another embodiment, the alumina particles may have an average diameter of between about 1 nm and about 40 nm. In another embodiment, the alumina particles may have an average diameter of between about 5 nm and about 40 nm. In another embodiment, the alumina particles may have an average diameter of between about 1 nm and about 30 nm. In another embodiment, the alumina particles may have an average diameter of between about 5 nm and about 30 nm. In another embodiment, the alumina particles may have an average diameter of between about 7 nm and about 20 nm.

In an embodiment, the alumina particles have an average diameter of less than or equal to about 30 nm. In an embodiment, the alumina particles have an average diameter of less than or equal to about 25 nm. In an embodiment, the alumina particles have an average diameter of less than or equal to about 20 nm. In an embodiment, the alumina particles have an average diameter of less than or equal to about 15 nm. In an embodiment, the alumina particles have an average diameter of less than or equal to about 10 nm. In an embodiment, the alumina particles have an average diameter of less than or equal to about 7 nm. In an embodiment, the alumina particles have an average diameter of at least about 5 nm. In an embodiment, the alumina particles have an average diameter of at least about 7 nm. In an embodiment, the alumina particles have an average diameter of at least about 10 nm. In an embodiment, the alumina particles have an average diameter of at least about 15 nm. In an embodiment, the alumina particles have an average diameter of at least about 20 nm. In an embodiment, the alumina particles have an average diameter of at least about 25 nm. Combinations of the above-referenced ranges are also possible.

Colloidal alumina is a flexible technology medium, allowing for customized surface treatment based on application. In an embodiment, the alumina is a GPTMS-functional alumina. GlycidoxyPropylTriMethoxySilane-functional alumina includes alkaline sol silica, available from Nissan Chemical America as AT-V6. Another GPTMS-functionalized alumina is an acidic type of silica sol, available from Nissan Chemical America as AT-OV6.

The amount of alumina nanoparticle used per unit of H2S is as follows: 1 unit of alumina nanoparticle per 3 units of H2S, in another embodiment, 1 unit of alumina nanoparticle per 5 units of H2S and in another embodiment, 1 unit of alumina nanoparticle per 10 units of H2S.

Some examples of nanoparticles can include particles of spherical shape, fused particles such as fused silica or alumina or particles grown in an autoclave to form a raspberry style morphology, or elongated silica particles. The particles being bare, or surface treated. When surface treated may be polar or non-polar The surface treatment is sufficient to allow the nanoparticle to be stable during transportation to the area where a $H_2S$ sorbent is required and for delivery. The stability achieved either by covalent, charge-charge, dipole-dipole, or charge-dipole interactions.

Triazines useful in the instant claimed invention include, but are not limited to, 1,2,3-triazine; 1,2,4-triazine and 1,3,5-triazine (aka s-triazine). Triazines useful in the instant claimed invention include Hexahydro-1,3,5-tris(hydroxyethyl)-s-triazine.

Triazines are alkaline and can cause carbonate scaling. Triazines are commercially available.

Triazines can be present in the process at a level of from about zero point 1 (0.1) units to about 1 unit per 3 units of H2S. Units could mean any quantitative measure, such as grams, pounds, mols, etc. etc.

$CO_2$ Point Source Purification is described in "Evaluation of $CO_2$ Purification Requirements and the Selection of Processes for Impurities Deep Removal from the $CO_2$ Product Stream", Zeina Abbas et al, Energy Procedia, Volume 37, 2013, Pages 2389-2396. Depending on the reference power plant, the type of fuel and the capture method used, the $CO_2$ product stream contains several impurities which may have a negative impact on pipeline transportation, geological storage and/or Enhanced Oil Recovery (EOR) applications. All negative impacts require setting stringent quality standards for each application and purifying the $CO_2$ stream prior to exposing it to any of these applications.

In the Abbas paper, the $CO_2$ stream specifications and impurities from the conventional post-combustion capture technology are assessed. Furthermore, the $CO_2$ restricted purification requirements for pipeline transportation, EOR and geological storage are evaluated. Upon the comparison of the levels of impurities present in the $CO_2$ stream and their restricted targets, it was found that the two major impurities which entail deep removal, due to operational concerns, are oxygen and water from 300 ppmv to 10 ppmv and 7.3% to 50 ppmv respectively. Moreover, a list of plausible technologies for oxygen and water removal is explored after which the selection of the most promising technologies is made. It was found that catalytic oxidation of hydrogen and refrigeration and condensation are the most promising technologies for oxygen and water removal respectively.

"Geothermal Energy System Streams" are described as follows:

Hot water is pumped from deep underground through a well under high pressure.

When the water reaches the surface, the pressure is dropped, which causes the water to turn into steam.

The steam spins a turbine, which is connected to a generator that produces electricity.

The steam cools off in a cooling tower and condenses back to water.

EXAMPLES

Materials

Stepanquat 200 is a 78.5% actives solution of Hexahydro-1,3,5-tris(hydroxyethyl)-s-triazine available commercially from Stepan Corp.

ST-O40, ST-30, ST-OV4, PGM-ST, ST-C, ST-V3, and MT-ST are commercially available colloidal silica products from Nissan Chemical America Corporation.

Organosilanes, Propylene Glycol Monomethyl Ether solvent, $NaHCO_3$, $CuCl_2$—$H_2O$, and Glyoxal were procured from Sigma Aldrich Corp.

Synthesis Example 1

1000 mL Snowtex® ST-30 from Nissan Chemical America Corporation (Aqueous alkaline colloidal silica dispersion, 30 wt % $SiO_2$ solids, 10-15 median particle size) was placed into a 2000 mL 4 neck glass reactor assembled with addition funnel, thermometer, heating mantle connected to voltage regulator, and mixer with 2 inch diameter trifoil mixing blade. Mixing was activated at 150 rpm and silicasol was brought to 50° C. Into the addition funnel was weighed 49.98 g of Aminoethylaminoethylaminopropyl Trimethoxysilane (CAS #35141-30-1, Sigma-Aldrich). Addition funnel was assembled to reactor top and silane was slowly added to stirring silicasol at a drop rate of 2 drops per second. After all organosilane had been added to reaction the mixture was allowed to stir at 50° C. for a period of 3 hours. Finished surface-treated alkaline silica was poured off to a 2 L Nalgene bottle for storage and use.

Synthesis Example 2

1.4 L Snowtex® O-XS (Aqueous acidic colloidal silica dispersion, 10 wt % colloidal silica median particle size 5 nm) was transferred to a 4-neck reaction kettle. To this vessel were also added 9.6 L distilled water. Copper (II) Chloride dehydrate ($CuCl_2$—$H_2O$, Sigma Aldrich), 13.87 g were added to the reaction flask and allowed to dissolve at room temperature under light agitation. A stock solution ("Solution A") of $NaHCO_3$(Sigma Aldrich ACS reagent grade, ≥99.7% was prepared (47.04 g $NaHCO_3$ dissolved in 12.6 L distilled water, 0.04 M final concentration). The stir rate in the reaction vessel was increased to 9500 rpm to achieve vigorous agitation. Solution A was added slowly 10-15 mL per minute to the reaction via addition funnel. After Solution A was added completely the reaction was allowed to stir at room temperature for 30 minutes and contents were removed for storage and use.

Synthesis Example 3

Snowtex® PGM-ST (Solvent borne dispersion of acidic colloidal silica, 30 wt % $SiO_2$ median particle size 10-15 nm dispersed in Propylene Glycol Monomethyl ether), 450 g were placed into a 1000 mL 4-neck reaction flask. Similar to Synthesis Example 1 the reactor was assembled with mixer, thermometer, and heating mantle/voltage regulator. A 4.05 g portion of 3-Mercaptopropyl Trimethoxysilane (Sigma Aldrich) were added to an addition funnel and assembled to the reactor. PGM-ST was brought to 50° C. under mild agitation and Mercaptopropyl trimethoxysilane was added dropwise via addition funnel at 1 drop/second until addition was complete. Reaction was kept at 50° C. for a period of 3 hours, then the surface-treated silicasol was poured off to a Nalgene container for storage and use.

Example 1, Comparative

Into a 1000 mL Nalgene bottle were placed 300 g distilled $H_2O$, 300 g Propylene Glycol Monomethyl Ether ("PGM") solvent, and 300 g Stepanquat 200. Contents were mixed thoroughly by shaking container vigorously for 30 seconds.

Example 2

Into a 1000 mL Nalgene bottle were placed 300 g distilled $H_2O$, 300 g Propylene Glycol Monomethyl Ether solvent, and 300 g Synthesis Example 1 fluid. Contents were mixed thoroughly by shaking container vigorously for 30 seconds.

Example 3, Comparative

Into a 1000 mL Nalgene bottle were placed 700 g distilled $H_2O$, and 300 g Stepanquat 200. Contents were mixed thoroughly by shaking container vigorously for 30 seconds.

Example 4

Into a 1000 mL Nalgene bottle were placed 300 g distilled $H_2O$, 300 g ST-O40 (Aqueous acidic colloidal silica available from Nissan Chemical America Corporation), and 300 g Stepanquat 200. Contents were mixed thoroughly by shaking container vigorously for 30 seconds.

Example 5

Into a 1000 mL Nalgene bottle were placed 300 g distilled $H_2O$, 300 g Synthesis Example 2 fluid, and 300 g Stepanquat 200. Contents were mixed thoroughly by shaking container vigorously for 30 seconds.

Example 6

Into a 1000 mL Nalgene bottle were placed 300 g distilled $H_2O$, 300 g ST-OV4 (Aqueous acidic hydrophilic surface treated colloidal silica available from Nissan Chemical America Corporation), and 300 g Stepanquat 200. Contents were mixed thoroughly by shaking container vigorously for 30 seconds.

Example 7

Into a 1000 mL Nalgene bottle were placed 300 g distilled $H_2O$, 300 g Synthesis Example 3 fluid, and 300 g Stepanquat 200. Contents were mixed thoroughly by shaking container vigorously for 30 seconds.

Example 8

Into a 1000 mL Nalgene bottle were placed 375 g aqueous solution of Glyoxal (Sigma Aldrich, 37.5 wt %) and 625 g ST-C (Aqueous alkaline colloidal silica dispersion partially surface treated with Aluminum Oxide available from Nissan Chemical America Corporation). Contents were mixed thoroughly by shaking container vigorously for 30 seconds.

Example 9

Into a 1000 mL Nalgene bottle were placed 375 g aqueous solution of Glyoxal (Sigma Aldrich, 37.5 wt %) and 625 g ST-O40 (Aqueous acidic colloidal silica dispersion available from Nissan Chemical America Corporation). Contents were mixed thoroughly by shaking container vigorously for 30 seconds.

Example 10

Into a 1000 mL Nalgene bottle were placed 375 g aqueous solution of Glyoxal (Sigma Aldrich, 37.5 wt %) and 625 g ST-V3 (Aqueous alkaline hydrophilic surface treated colloidal silica dispersion available from Nissan Chemical America Corporation). Contents were mixed thoroughly by shaking container vigorously for 30 seconds.

Example 11

Into a 1000 mL Nalgene bottle were placed 375 g aqueous solution of Glyoxal (Sigma Aldrich, 37.5 wt %) and 625 g MT-ST (Solvent borne acidic colloidal silica dispersed in Methanol, 30 wt % $SiO_2$, 10-15 nm median particle size, available from Nissan Chemical America Corporation). Contents were mixed thoroughly by shaking container vigorously for 30 seconds.

Example 12: Comparative

Into a 1000 mL Nalgene bottle were placed 375 g aqueous solution of Glyoxal (Sigma Aldrich, 37.5 wt %) and 625 g distilled $H_2O$. Contents were mixed thoroughly by shaking container vigorously for 30 seconds.

MEA Triazine was kept at a constant concentration across all the Inventive and Comparative examples. Similarly, Glyoxal concentration was kept constant across all Inventive and Comparative examples.

Testing for Removal of $H_2S$

Each solution tested was equilibrated for weight at 300 g total solution and placed into a vessel with overhead port to measure $H_2S$ content in the vessel headspace. The headspace port was connected to a Drager Pac® 3500 gas monitor (Dragerwerk AG&Co. KGaA). A mixed gas of 10% $H_2S$/90% Nitrogen was bubbled through the test solution at a standard rate of 475 mL/minute, solution held at 22° C., and headspace monitored for $H_2S$ content. A reading of 0 means the sensor is not detecting any $H_2S$ in the flow gas stream after the gas has passed through the tested solution. Vessel headspace was monitored for $H_2S$ content once per minute continuously until a $H_2S$ content of 40 reading on gas monitor was reached, at which point the test example in solution reacting with $H_2S$ was considered to be consumed and the experiment stopped. Times to initial $H_2S$ reading and Time to complete $H_2S$ breakthrough were recorded and compared to controls/comparative examples.

Summary of Results

The Number of minutes is listed is how long the detector detected a value of "0" for H2S. The Table is ordered from best performance in terms of removal of H2S to worst performance.

| Example | Time to initial H2S reading (minutes) | Time to 40% H2S reading (minutes) | Composition | nanoparticle type |
|---|---|---|---|---|
| 2 | 124 | 160 | Triazine + Water + Amine func. SiO2 | Amine-Functional SiO2 |
| 1 | 117 | 145 | Triazine + Water + PGMsolvent (Comparative Example) | none |
| 8 | 107 | 184 | Glyoxal + ST-C | Aluminum oxide functional SiO2 |
| 4 | 71 | 164 | Triazine + Water + ST-040 | Aqueous acidic SiO2 |
| 10 | 55 | 146 | Glyoxal + ST-V3 | Glycidoxy functional SiO2, alkaline |
| 5 | 55 | 139 | Triazine + Water + CuOXS | Transition Metal functional SiO2 |
| 7 | 55 | 105 | Triazine + Water + Mercapto functionalized PGM-ST | Mercapto Functional SiO2 |
| 9 | 51 | 86 | Glyoxal + ST-O40 | Aqueous acidic SiO2 |
| 3 | 44 | 61 | Triazine + Water (Comparative Example) | none |
| 6 | 39 | 153 | Triazine + Water + ST-OV4 | Glycidoxy functional SiO2, acidic |
| 12 | 8 | 14 | Glyoxal + Water (Comparative Example) | none |
| 11 | 1 | 2 | Glyoxal + MT-ST | Solventborne SiO2, acidic |

Observations about the Examples

1. Example 1: This is a Triazine controls/comparative examples with MEA Triazine dissolved in a mixture of water and PGM solvent. This example performed very well, much better than MEA Triazine alone at the same concentration dissolved in water. It is believed, without intending to be bound there bye, that it is possible PGM is actually very beneficial in Triazine+H2S reaction.
2. Example 2 (Amine-functional $SiO_2$ combined with Triazine) performed very well compared to the comparative example, with improved/delayed time to initial H2S breakthrough and also time to final breakthrough (when the H2S readings reached a 40% level in the headspace above the sample).
3. Example 3 is the Triazine+water control, these times were used comparatively for all the Triazine+nanosilica examples. Example 3 exemplifies the standard field grade fluid of MEA Triazine fluid for treatment of sour gas.
4. Example 4 (ST-O40, Aqueous acidic silica+Triazine) performed the best of all Triazine+nanosilica examples. It is believed, without intending to be bound thereby, that the solid acidity of the acidic silica surface is likely acting as a catalyst to make the Triazine+H2S reaction more complete, leading to greatly improved/delayed time to initial and complete H2S breakthrough.
5. Example 5 (Copper functionalized nanosilica+Triazine) performed relatively well in improved/delayed time to initial and complete H2S breakthrough. This example is the only example of Transition Metal functional silica. (It is noted that the Aluminum present in Example 8 is not considered a true Transition metal, as it is a "Post Transition Metal".)
6. Example 6 (ST-OV4+Triazine) is aqueous acidic silica functionalized with hydrophilic organic surface treatment and is commercially available from Nissan Chemical America. This example had slightly worse time to H2S initial breakthrough, but had a greatly improved time to complete H2S breakthrough compared to the control (Example 3).
7. Example 7 (Mercapto-functional nanosilica dispersed in PGM+Triazine)—Slightly improved time to initial H2S breakthrough and much improved time to complete H2S breakthrough. It is believed, without intending to be bound thereby, that the Mercapto surface functionality can disrupt polymer formation in the Triazine+H2S reaction.
8. Example 8 is ST-C (Aqueous alkaline colloidal silica with Aluminum Oxide surface) combined with Glyoxal. Compared to Glyoxal alone this combination of ST-C+Glyoxal showed dramatic improvements in both time to initial and time to complete H2S breakthrough. The Glyoxal+nanosilica examples performed relatively well. It is noted that the Aluminum present in Ex. 8 is not considered a true Transition metal, as it is a "Post Transition Metal".
9. Example 9 (ST-O40+Glyoxal) performed much better than Glyoxal alone.
10. Example 10 (ST-V3, Aqueous alkaline silica with hydrophilic organic surface treatment+Glyoxal) performed very well compared to Glyoxal alone.
11. Example 11 (Acidic silica dispersed in Methanol) did not perform well, this example had the worst results of all. It is believed, without intending to be bound thereby that MT-ST completely deactivated Glyoxal from reacting with H2SJ
12. Example 12 is the solution of Glyoxal and water only, a comparative example with no added nanotechnology.

The invention claimed is:

1. A process to remove $H_2S$ from a stream comprising the steps of adding c) One or more aqueous acidic silica nanoparticle compositions and d) One or more Triazine compounds, wherein the stream is selected from the group consisting of Oil streams, Gas streams, $CO_2$ point source purification streams and Geothermal Energy System streams.

2. The process of claim 1 in which one of the triazines present is hexahydro-1,3,5-tris(hydroxyethyl)-s-triazine.

3. The process of claim 1 in which the stream is an Oil stream.

4. The process of claim 1 in which the stream is a Gas stream.

5. The process of claim 1 in which the stream is a $CO_2$ point source purification stream.

6. The process of claim 1 in which the stream is a Geothermal Energy System stream.

* * * * *